US008346622B2

(12) United States Patent  
Shetty

(10) Patent No.: US 8,346,622 B2  
(45) Date of Patent: Jan. 1, 2013

(54) CONNECTION SYSTEM

(75) Inventor: Naresh Shetty, Dubai (AE)

(73) Assignee: eBay Inc., San Jose, CA (US)

( * ) Notice: Subject to any disclaimer, the term of this patent is extended or adjusted under 35 U.S.C. 154(b) by 133 days.

(21) Appl. No.: 12/427,014

(22) Filed: Apr. 21, 2009

(65) Prior Publication Data

US 2010/0211473 A1 Aug. 19, 2010

Related U.S. Application Data

(60) Provisional application No. 61/152,973, filed on Feb. 17, 2009.

(51) Int. Cl.
G06Q 30/00 (2012.01)
(52) U.S. Cl. ................................... 705/26.61
(58) Field of Classification Search ............. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 5,283,731 A | 2/1994 | Lalonde | |
| 6,434,599 B1 * | 8/2002 | Porter | 709/204 |
| 6,847,938 B1 * | 1/2005 | Moore | 705/26 |
| 7,062,466 B2 | 6/2006 | Wagner | |
| 7,167,546 B2 * | 1/2007 | Moore | 379/88.12 |
| 7,363,256 B2 | 4/2008 | Thiam | |
| 7,370,006 B2 | 5/2008 | Kopelman | |
| 7,373,319 B2 | 5/2008 | Kopelman | |
| 7,426,492 B1 | 9/2008 | Bishop | |
| 7,433,845 B1 | 10/2008 | Flitcroft | |
| 7,475,030 B1 | 1/2009 | Tenorio | |
| 7,487,111 B2 | 2/2009 | Shoen | |
| 8,046,259 B1 * | 10/2011 | Siegel et al. | 705/14.73 |
| 2001/0049636 A1 * | 12/2001 | Hudda et al. | 705/26 |
| 2003/0078858 A1 | 4/2003 | Angelopoulos | |
| 2003/0078972 A1 * | 4/2003 | Tapissier et al. | 709/204 |
| 2004/0098315 A1 * | 5/2004 | Haynes et al. | 705/26 |
| 2006/0206383 A1 | 9/2006 | Litt | |
| 2007/0022007 A1 * | 1/2007 | Lawe | 705/14 |
| 2007/0031800 A1 | 2/2007 | Solomon | |
| 2007/0287488 A1 | 12/2007 | Faber | |
| 2008/0021758 A1 * | 1/2008 | Teichmann et al. | 705/9 |
| 2008/0103810 A1 * | 5/2008 | Bocheck | 705/1 |
| 2008/0255966 A1 | 10/2008 | Kopelman | |
| 2008/0294556 A1 * | 11/2008 | Anderson | 705/44 |
| 2009/0012874 A1 | 1/2009 | Case | |

(Continued)

FOREIGN PATENT DOCUMENTS

GB 2369468 A 5/2002

OTHER PUBLICATIONS

Steve Rigney, "Net watch. (preventing spam)", Computer Shopper, v18, n1, p. 370(1), Jan. 1998. Retrieved from Dialog File: 275, Acc#: 02166621.*

(Continued)

Primary Examiner — Naeem Haq
(74) Attorney, Agent, or Firm — Schwegman Lundberg Woessner, P.A.

(57) ABSTRACT

Various embodiments include systems and methods for providing communication among a plurality of users with complementary requirements in an electronic network.

13 Claims, 14 Drawing Sheets

U.S. PATENT DOCUMENTS

2009/0012878 A1    1/2009   Tedesco
2009/0234876 A1*   9/2009   Schigel et al. ................ 707/102
2010/0029312 A1*   2/2010   Smith et al. .................. 455/466

OTHER PUBLICATIONS

Webpage: "FindAll.com", (http://www.findall.com/cgibin/pr_alert), download date: Apr. 16, 2009.

Webpage: "WiiAlerts.com wii alert—you buy", (http://wiialerts.com/), download date: Apr. 16, 2009.

Webpage: "LineJumpers.com: First In Line, Everytime", (http://www.linejumpers.com/index.action), download date: Apr. 16, 2009.

Webpage: "Jangl powers dating site Match.com Anonymous Voice Chat", (http://blog.tmcnet.com/blog/tom-keating/voip/jangl-powers-dating-site-matchcom-anonymous-voice-chat.asp), download date: Apr. 16, 2009.

Webpage: "Match.com Help/FAQ Instant Messaging", (http://msn.match.com/matchus/help/helpdtl.aspx?sec=62&lid=108), download date: Apr. 16, 2009.

Webpage: "eBay Welcome! Sign in or register", (http://www.ebay.com/), download date: Apr. 16, 2009.

Webpage: "monster Your calling is calling", (http://www.monster.com/), download date: Apr. 16, 2009.

Webpage: "craigslist atlanta", (http://atlanta.craigslist.org/), download date: Apr. 16, 2009.

Webpage: "olx Free classifieds", (http://www.olx.com/), download date: Apr. 17, 2009.

Webpage: "The New York Times Classifieds Marketplace", (http://www.nytimes.com/ref/classifieds/), download date: Apr. 16, 2009.

* cited by examiner

CONNECTION SYSTEM

The present application claims the benefit of priority of the following provisional patent application: U.S. Provisional Patent Application No. 61/152,973, filed Feb. 17, 2009, entitled "Simple method & system to connect people with complementary requirements", the entirety of which is incorporated by reference herein.

BACKGROUND

People at different points in their lives may seek & offer information/data, goods, services, partners, etc. For these purposes, people may seek commercial operations that specialize in specific areas of business, e.g., a person seeking a book, might visit a book store. Transactions may be person-to-person transactions. E.g., a person needs a babysitter in his/her neighborhood. In some embodiments, people or entities may be placed into one of the two categories, a) those who seek and b) those who offer.

Several systems exist that connect those seeking with those offering. According to some classification schemes, these can be broadly grouped as:

A. Advertising mediums, including television, print, online, mail, etc.

B. Direct sales, including door-to-door marketing, telephone marketing, etc.

C. Word of mouth, including referrals through friends, family and acquaintances

D. Direct matching systems, including classified advertisements in print media, subject-focused Internet websites that match offerers with seekers (e.g., auction, dating, and job sites; e.g., general use free classified sites)

Systems A and B may be costly and are sometimes effectively limited to use by commercial businesses that have capital to allocate toward advertising and sales.

System C may limit the connection making process to the extent of a person's individual network of people.

System D, while meeting the needs of some, may have certain limitations.

DESCRIPTION OF EMBODIMENTS

Figure 1:
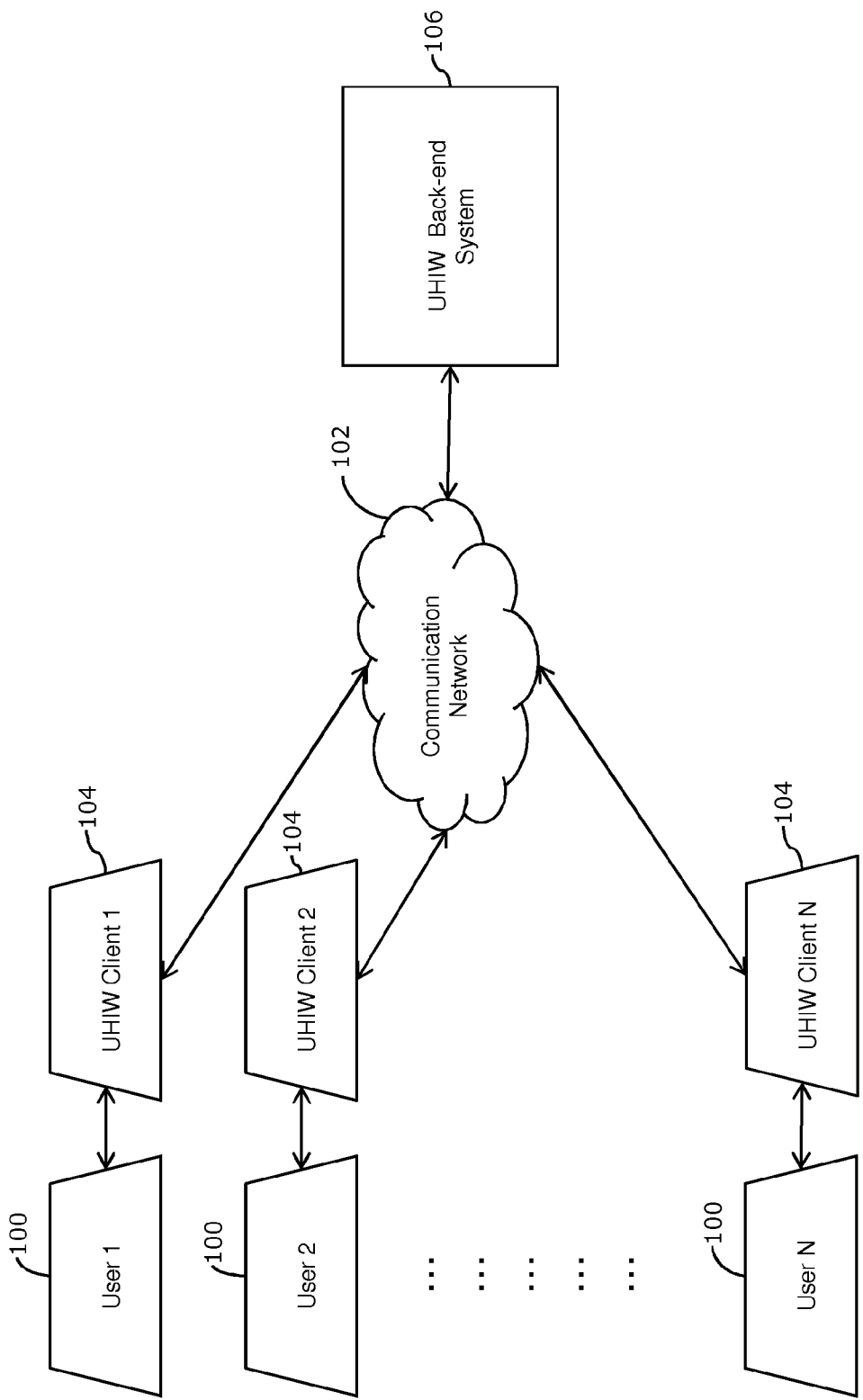
FIG. 1 is a schematic illustrating an environment of a UHIW system according to some embodiments.

As used herein, a communication network may refer to a network of communication devices and/or stations having wired or wireless interconnection for establishing communication. Communication may include, without limitation, transmitting and receiving signals. Communication may further include, without limitation, transferring information and data such as voice, audio, video, graphics and the like. Communication network may include, without limitation, Internet, intranet, extranet, Wide Area Network (WAN), wireless WAN (WWAN), Local Area Network (LAN), wireless LAN (WLAN), transducer links such as those using Modulator-Demodulators (modems), telecommunication network, personal area network and Global Navigation Satellite System (GNSS). Telecommunication network may include, without limitation, Public Switched Telephone Network (PSTN), Global System for Mobile Communications (GSM), and Code Division Multiple Access network (CDMA). Personal area network may include, without limitation, Bluetooth and Infrared, and Global Navigation Satellite System (GNSS).

In the following description, specific details are set forth in order to provide a thorough understanding of various embodiments. However, it will be apparent to a person of ordinary skill in the art, that various embodiments may be practiced without these specific details, or with additional details. Various aspects and features of example embodiments are described in detail hereinafter.

Various embodiments include systems and methods for connecting buyers/seekers with sellers/offerers. Various embodiments allow seekers and offerers to find one another without paying listing fees. Various embodiments allow seekers and/or offerers to post an indication of a product or service to buy or sell. Various embodiments allow seekers and/or offerers to post an indication of a desire to accomplish something. Various embodiments may allow the postings to remain active or relevant for significant periods of time, such as days, weeks, months, or years.

Various embodiments may allow seekers and/or offerers to find each other with minimal data entry required. Various embodiments may allow seekers and/or offerers to find each other without the necessity of extensively browsing postings or profiles of their counterparts. Various embodiments may allow seekers and/or offerers to communicate with each other with minimal lag in communication.

Various embodiments may allow seekers and offerers to communicate directly. Various embodiments may provide similar perspectives and/or user interfaces to both seekers and offerers. Various embodiments may account for the possibility that the number of offerers may not necessarily exceed the number of seekers, and vice versa.

Various embodiments may allow seekers to communicate with offerers without revealing personal information, such as email addresses. Various embodiments may allow offerers to communicate with seekers without revealing personal information, such as email addresses.

Various embodiments may deter spam and repetitive commercial listings.

Various embodiments may allow a poster (e.g., a seeker or an offerer) to specify a geographical reach for his/her posting. Thus, in some embodiments, a poster may reach multiple cities with a single posting. E.g., a single posting may be accessible from multiple cities. In some embodiments, a seeker may search for products, services, etc., across multiple geographic regions through a single site or interface.

FIG. 1 is a schematic depicting an environment of a UHIW (You have I Want) system for connecting people with complementary requirements. According to some embodiments, the UHIW system approaches the matchmaking problem by capturing the needs of the two sides through minimal data entry and focusing on the objective of connecting people with complementary needs. According to some embodiments, the environment comprises a plurality of users, a communication network 102, and a UHIW system that includes a UHIW client 104 for each user and a UHIW Back-end system 106.

Users may access UHIW Back-end system 106 using an electronic device such as computer, cell-phone or the like through communication network 102. The electronic device may host a UHIW client 104 which uses communication network 102 to connect with UHIW Back-end system 106. UHIW client 104 may be different for each user depending upon the electronic device.

In some embodiments, users may register with UHIW Back-end system 106. During registration, users may provide their contact information. The contact information may include username, user phone number, user chat id, email id, etc.

After registering, a user may submit details of one or more products through UHIW client 104. A user may submit 'requirement details' of a product if the user wants to buy that product. A user may submit 'offering details' of a product if the user wants to sell that product. A product may be any physical commodity, good, service, or any information. A single user may submit requirement/offering details for any number of products. The requirement details and the offering details may be provided in the form of keywords. Keywords may be entered using one or more means. For example, keywords may be entered into a box using a keyboard or may be selected through a drop down menu.

Offering details and requirement details may be stored by UHIW Back-end system 106. For each detail, the contact information of the corresponding user who submitted the details may also be stored.

UHIW Back-end system 106 may match the requirement details with the offering details. Each requirement detail may match with one or more offering details and vice versa. A user who submits a particular requirement/offering detail may be presented with all the matched results. For example, Back-end system 106 may determine that a match exists between an offer and a requirement if a keyword from the offering details corresponding to the offer is the same as a keyword from the requirement details corresponding to the requirement.

A user, through user interface 104, may view all the matched results corresponding to the requirement/offering details submitted by her.

Figure 2:
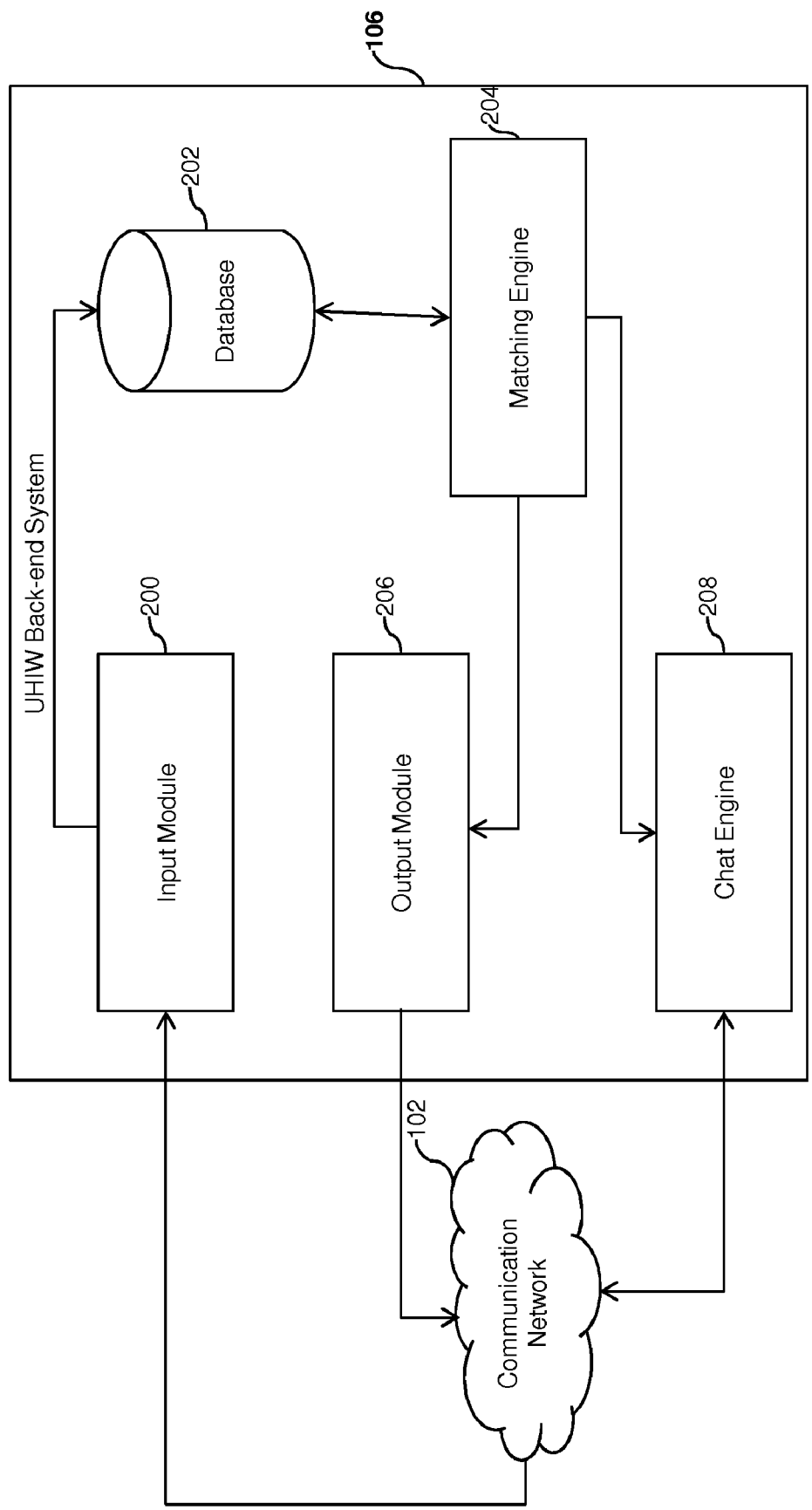
FIG. 2 is a block diagram illustrating a system of connecting users with complementary requirements according to some embodiments.

FIG. 2 is a block diagram illustrating the different components of UHIW Back-end system 106. According to some embodiments, UHIW system 106 comprises an input module 200, a database 202, a matching engine 204, an output module 206 and a chat engine 208.

In some embodiments, input module 200 receives an 'I want'/'I have' message from user 100.

Each incoming message may be pushed to the database 202. In some embodiments, database 202 may store all 'I want' messages and 'I have' messages received from various users. In addition, database 202 may also store contact information of some or all users.

In some embodiments, matching engine 204 matches an 'I want' message with one or more 'I have' messages. Matching engine 204 may also match an 'I have' message with one or more 'I want' messages. Matching engine 204 may use a search engine such as Lucene for matching results. Matching engine 204 may index the stored messages in advance of the matching process in order to enable a faster matching process. An index of messages may be prepared corresponding to each keyword and keyword combinations. The matching process may include several iterations based on different fields of information in the message. As will be appreciated, the matching engine may employ various search algorithms, matching algorithms, or various other algorithms, according to various embodiments. The matched results may be stored in database 202.

Output module 206 may output matched results to user 100 through UHIW client 104. User 100 may have the option to delete any result from the matched result list. So if a user subsequently accesses the matched result list, the deleted result may not appear in the list.

Chat engine 208 may provide a communication channel to user 100 for establishing communication with other users. Communication may be through an external chat client, an internal chat client, and/or through a combination of the two. Examples of external chat clients include Gtalk, Yahoo messenger, MSN messenger, etc. Examples of internal chat clients include Jabber, Coccinella, etc.

If the user associated with a matched result is 'online' (e.g., on any of the chat client services available—internal or external), user 100 may send her a request for a chat conversation. The other user may accept or deny user 100's request.

If the user associated with a matched result is 'offline', user 100 may send an offline message to her. The offline message may be sent as SMS to her cell-phone, as email, or as a notification in a chat client.

Chat engine 208 may also provide a mail inbox facility (UHIW system message box) to receive offline notifications from other users. User 100 may view the notifications in UHIW system message box after she logs into the UHIW system. In some embodiments, logging into the UHIW may be user 100's sole means of accessing the notifications.

Figure 3:
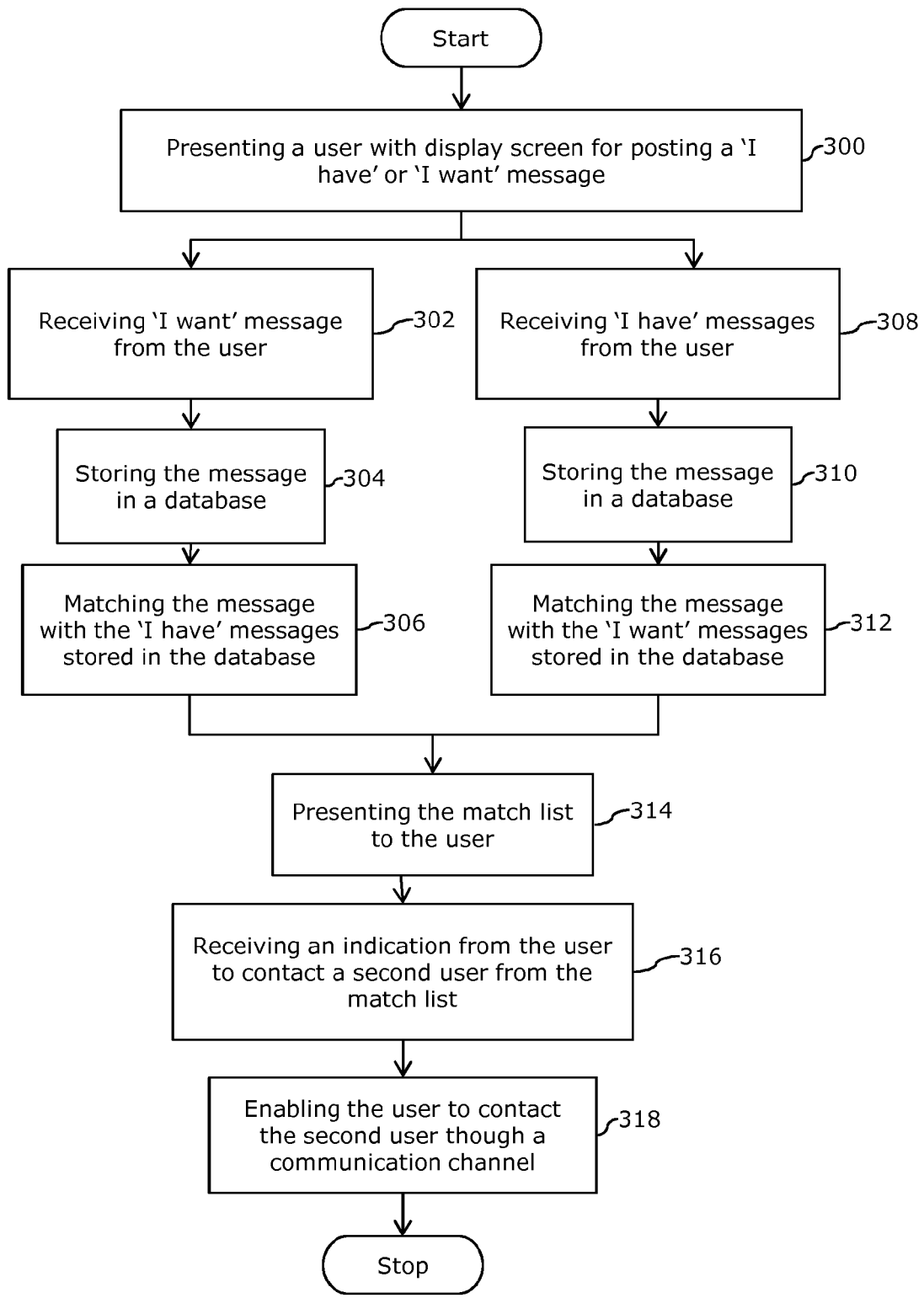
FIG. 3 is a flow diagram illustrating a method of connecting users with complementary requirements according to some embodiments.

FIG. 3 is a flow diagram illustrating a method for connecting users 100 with complementary requirements using UHIW system. FIG. 3 is discussed in conjunction with FIGS. 5A, 5B, 5C, 5D, 5E and 5F, which illustrate displays presented to users on UHIW client 104.

At step 300, after user 100 has logged into the UHIW application, she may be asked to choose from options of posting an 'I want' or 'I have' message. FIGS. 5A to 5D illustrate the display presented to user 100, the display providing the user with various options. Options may be chosen by clicking on the tabs, e.g., the 'I want' tab 500 or 'I have' tab

502. User 100 may choose 'I want' tab 500 to post requirement details (an 'I want' message) for a product which user 100 wants to purchase. User 100 may choose 'I have' tab 502 to post offering details (an 'I have' message) for the product she wants to sell.

Figure 5A:
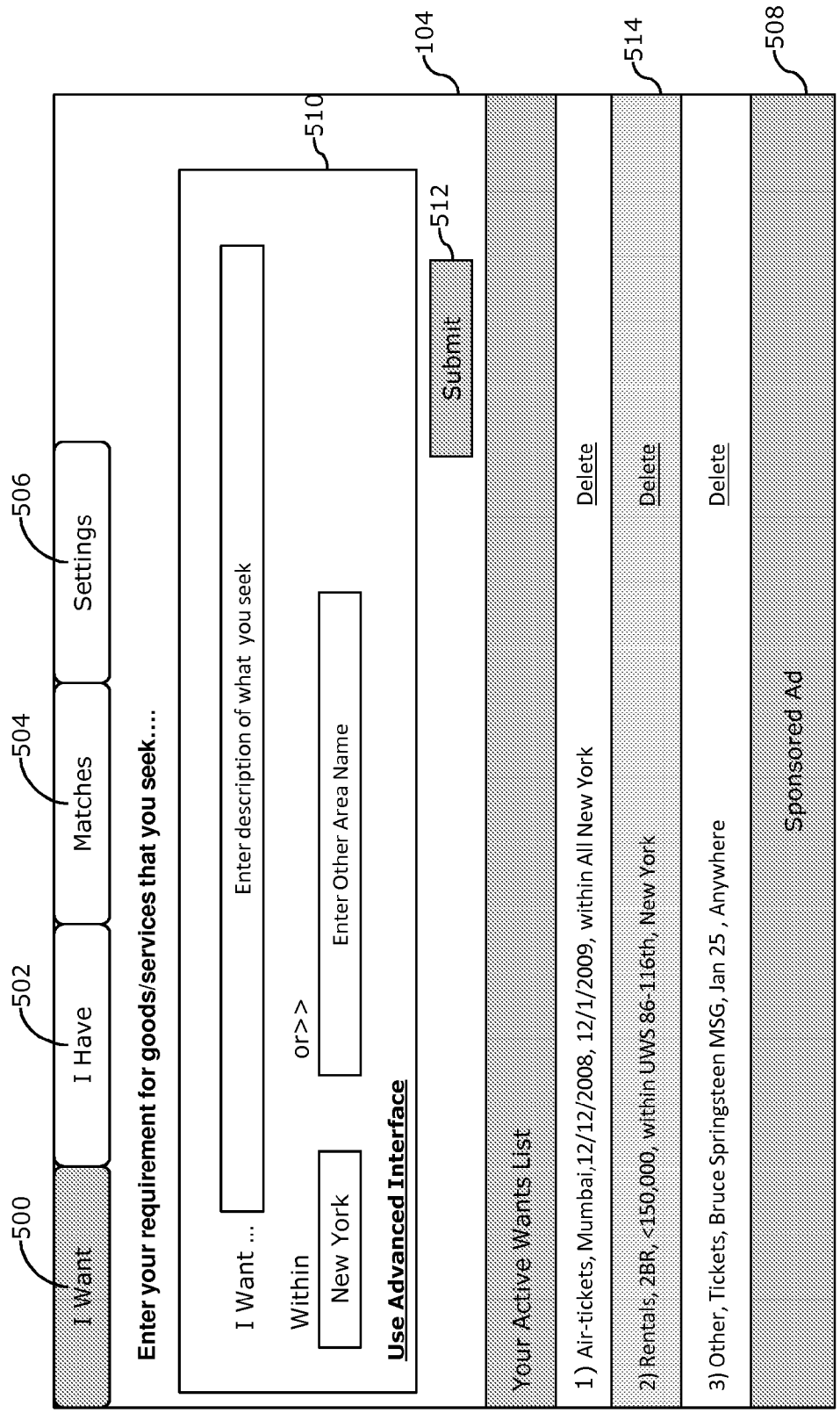
FIG. 5A is an example client interface illustrating an 'I Want' display for providing requirement details of a product required by a user according to some embodiments.

At step 302, an interface (as illustrated in FIG. 5A) may be provided to user 100 enabling her to post a new 'I want' message. In some embodiments, an 'I want' interface display may include a text area 510, a 'submit' button 512 and a table 514. Text Area 510 is the portion, where an 'I want' message for the product may be posted. An 'I want' message may comprise a combination of keywords. Text area 510 may provide one or more text boxes where a user may enter keywords. The keywords may reflect a product name, product specifications, a cost associated with a product, or any other feature or characteristic of a product, service, etc. Various mechanisms may be used for entering keywords. In some embodiments, keywords may be typed in using a keyboard. In some embodiments, keywords may be selected using a drop-down menu. For example, keyword 'California' may be selected through a drop-down menu which lists all state names in the USA. In some embodiment, keywords may be entered under various headings using the advanced interface illustrated in FIG. 5B.

Figure 5B:
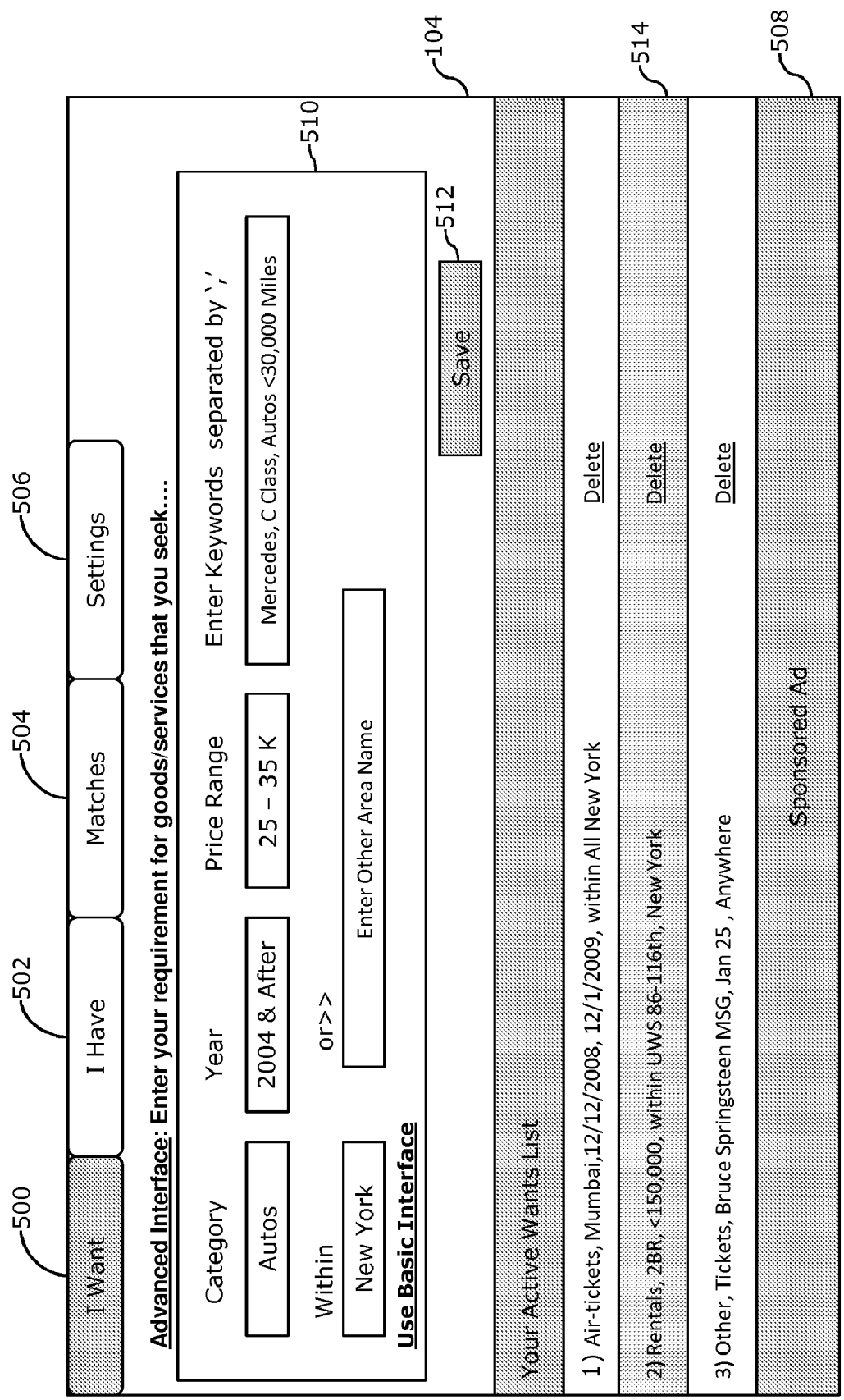
FIG. 5B is an example client interface illustrating an advanced 'I Want' display for providing requirement details of a product required by a user according to some embodiments.

For example, in FIG. 5B, multiple headings such as 'category', 'year', 'price range' etc. are provided. There may be a separate space to fill in general keywords. In the example, illustrated in FIG. 5B, the user has filled in keywords 'autos', '2004 & after', '25-35 K', 'Mercedes, C Class, Autos<30,000 Miles', and 'New York' under various headings. These keywords may reflect the expectations of user 100 regarding that particular product. In some embodiments, one keyword may be given priority over another, or over all other key words (e.g., over all other keywords in a posting). In the above example, keyword 'autos' may be given priority over others.

'Save' button 512 may be used to post the request to UHIW Back-end system 106.

Table 514 lists 'I want' messages previously posted by user 100. User 100 may delete any message from table 514 and then the message may also be deleted from database 202.

At step 304, the new 'I want' message posted may be stored in database 202. Thereafter, this 'I want' message may also appear in table 514.

Database 202 may store some or all the messages posted by various users.

At step 306, UHIW Back-end system 106 matches the new 'I want' message with one or more 'I have' messages in database 202. Matching engine 204 retrieves keywords from the 'I want' message and may use various algorithms (for example, search algorithms) to match the messages. Matching engine may also apply these algorithms to the contact information of user 100. The 'I have' messages that match with the new 'I want' message are associated with the new 'I want' message. For example, database 202 may create a record to store the new 'I want' message, and may store within that record an identifier associated with each of the matching 'I have' messages.

Figure 5C:
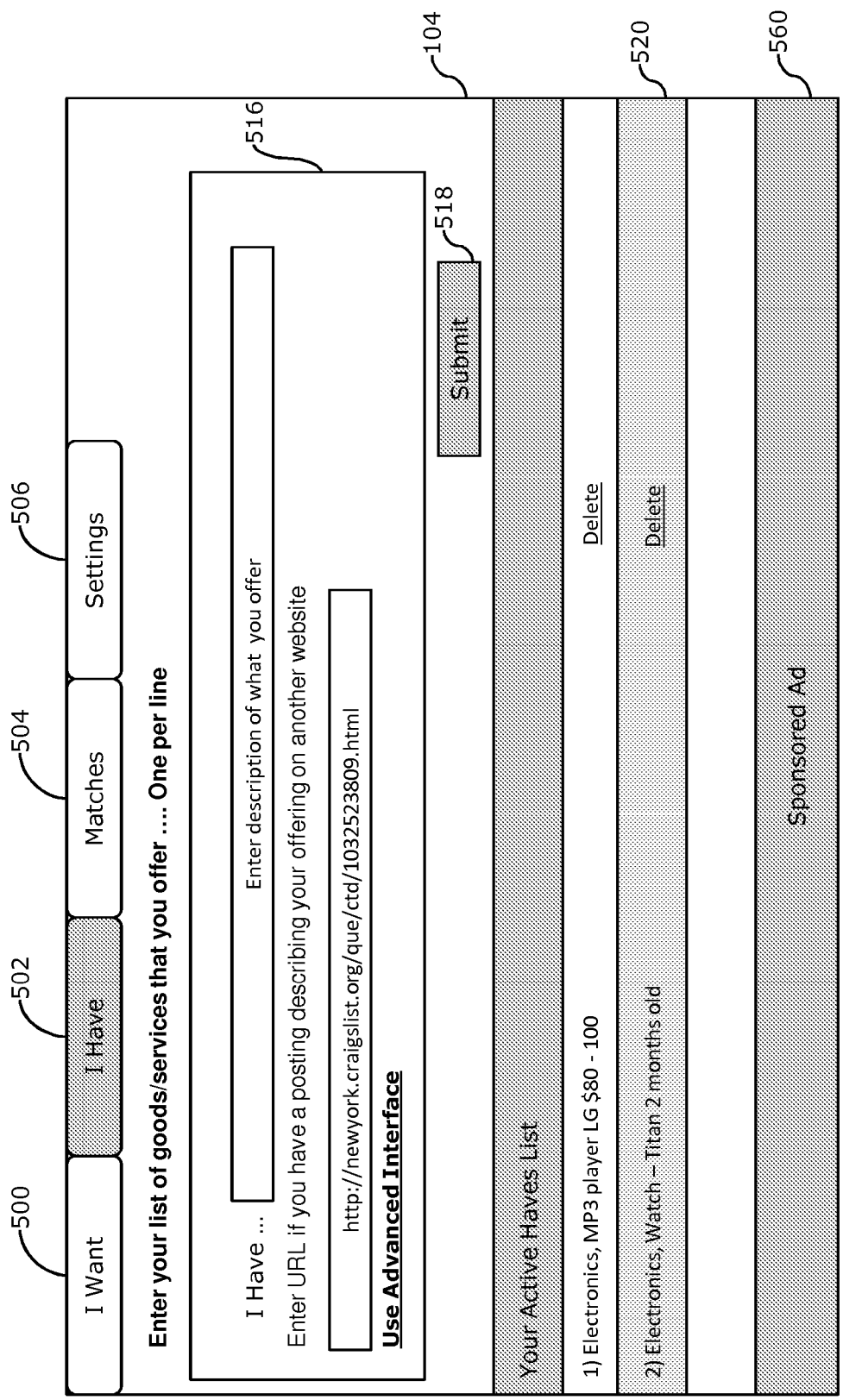
FIG. 5C is an example client interface illustrating an 'I Have' display for providing product details of a product offered by a user according to some embodiments.
Figure 5D:
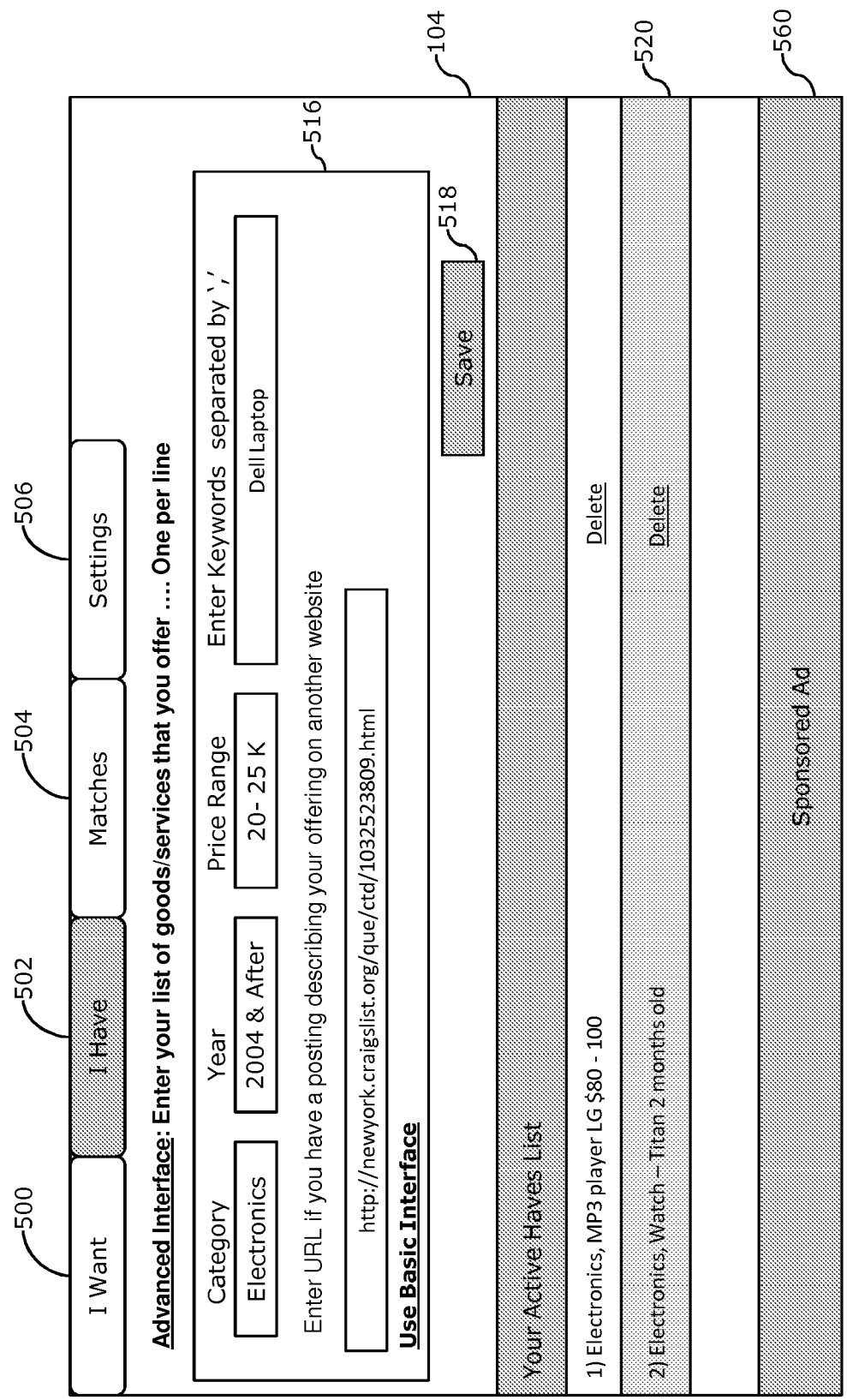
FIG. 5D is an example client interface illustrating an advanced 'I Have' display for providing product details of a product offered by a user according to some embodiments.

Steps 308, 310 and 312 are steps that may be executed if user 100 wants to post an 'I have' message using the 'I have' screen. Step 308, 310, and 312 are analogous to steps 302, 304, and 306 respectively. As illustrated in FIG. 5C, 'I have' messages posted by user 100 in text area 516 may appear in table 520 after the user has saved them using save button 518. Text area 516 may provide one or more text boxes to enter keywords, and the messages may then be stored in database 202. In some embodiments, an advanced interface shown in FIG. 5D may also be used to post an 'I have' message.

The step of matching may be performed by UHIW system for each 'I want' message and each 'I have' message stored in database 202. Thus, corresponding to each 'I want' message there may be one or more matching 'I have' messages. Similarly, corresponding to each 'I have' message there may be one or more matching 'I want' messages.

Matching for a message may be done immediately after any message is posted or may be done after a fixed time. User 100 may log off after posting the message.

Figure 5E:
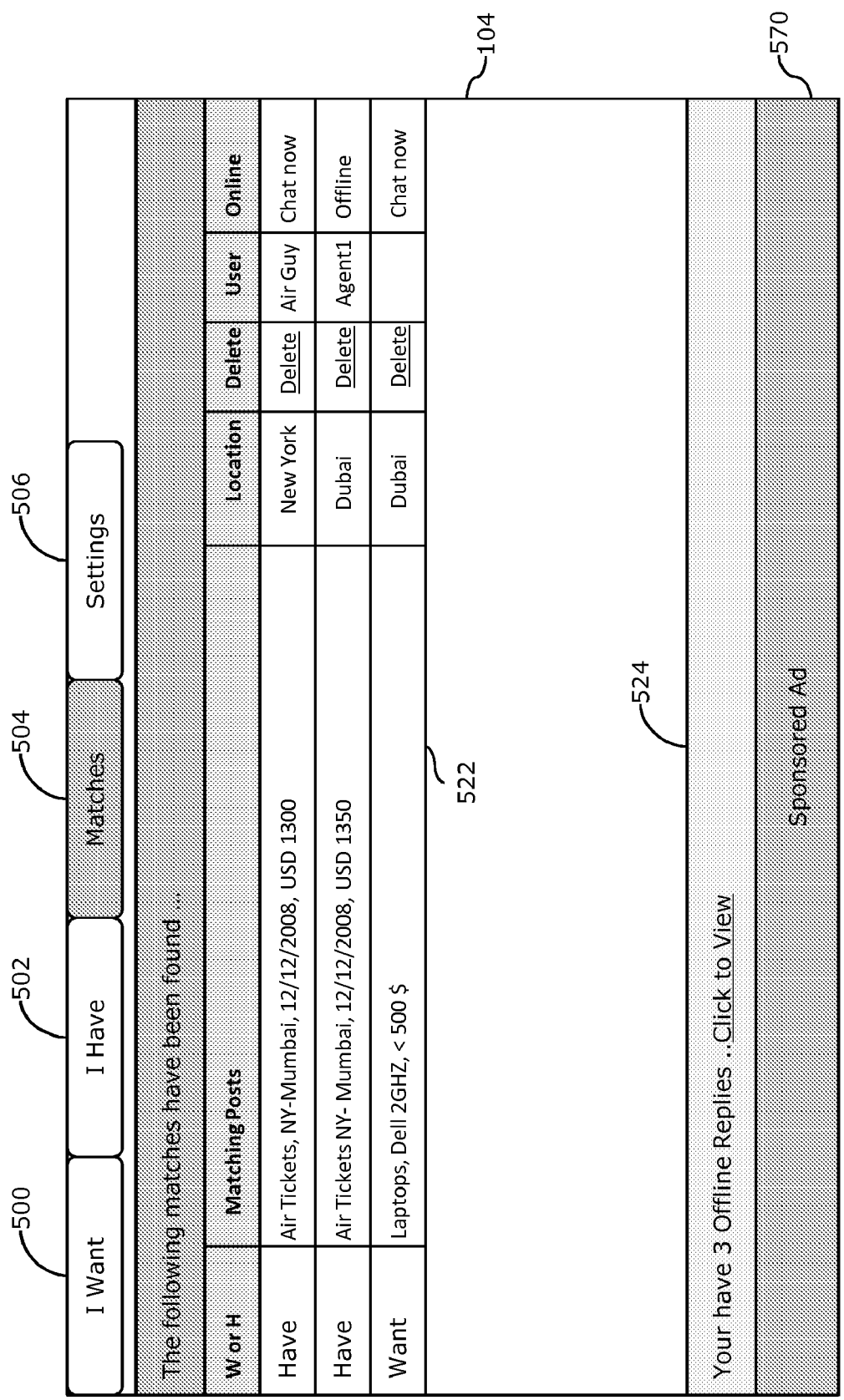
FIG. 5E is an example client interface illustrating a 'Matches' display for presenting matched results to a user according to some embodiments.

In case user 100 wants to view the matched results for his 'I have'/'I want' messages, step 314 is executed. FIG. 5E illustrates an exemplary display for displaying matched results to user 100. User 100 may view the matched results by clicking on matches tab 504.

According to some embodiments, the 'matches' screen includes a table 522 and a view message link 524.

Table 522 presents each matching result in a row. According to some embodiments, each matching result may include type of message, message description, user id or alias of user who posted that matched message, and a link to contact that user. The type of messages may be 'I want', if the match corresponds to an 'I have' message and 'I have' if the match corresponds to an 'I want' message. User 100 may also have the option to delete any matched result using the delete option. In that case, the entry may be deleted from matched results of that message in database 202.

Table 522 may indicate which of the users associated with the matched results are online. A user may be online if she is logged into UHIW Back-end system 106 or if she is available on her chat id (e.g., if she is logged onto an external chat system). If a user associated with a matched result is online, user 100 may contact her by clicking on the 'chat now' link.

At step 316, UHIW Back-end system 106 may receive a request from user 100 to contact an online user (e.g., an online user corresponding to a match that user 100 has received). For example, referring to FIG. 5E, user 100 may click on or otherwise select "Chat now" in order to request to contact the user known as 'Air guy' in the matched results.

At step 318, on approval of the user 'Air guy', user 100 may chat with her. Chat engine 208 may facilitate the chatting functionality between the two users. In case the corresponding user (e.g., 'Agent 1') is offline, an offline message may be sent to her UHIW application, email, cell-phone or any external chat client. In FIG. 5E, user 100 may check her chat histories or offline messages in view message link 524.

Figure 5F:
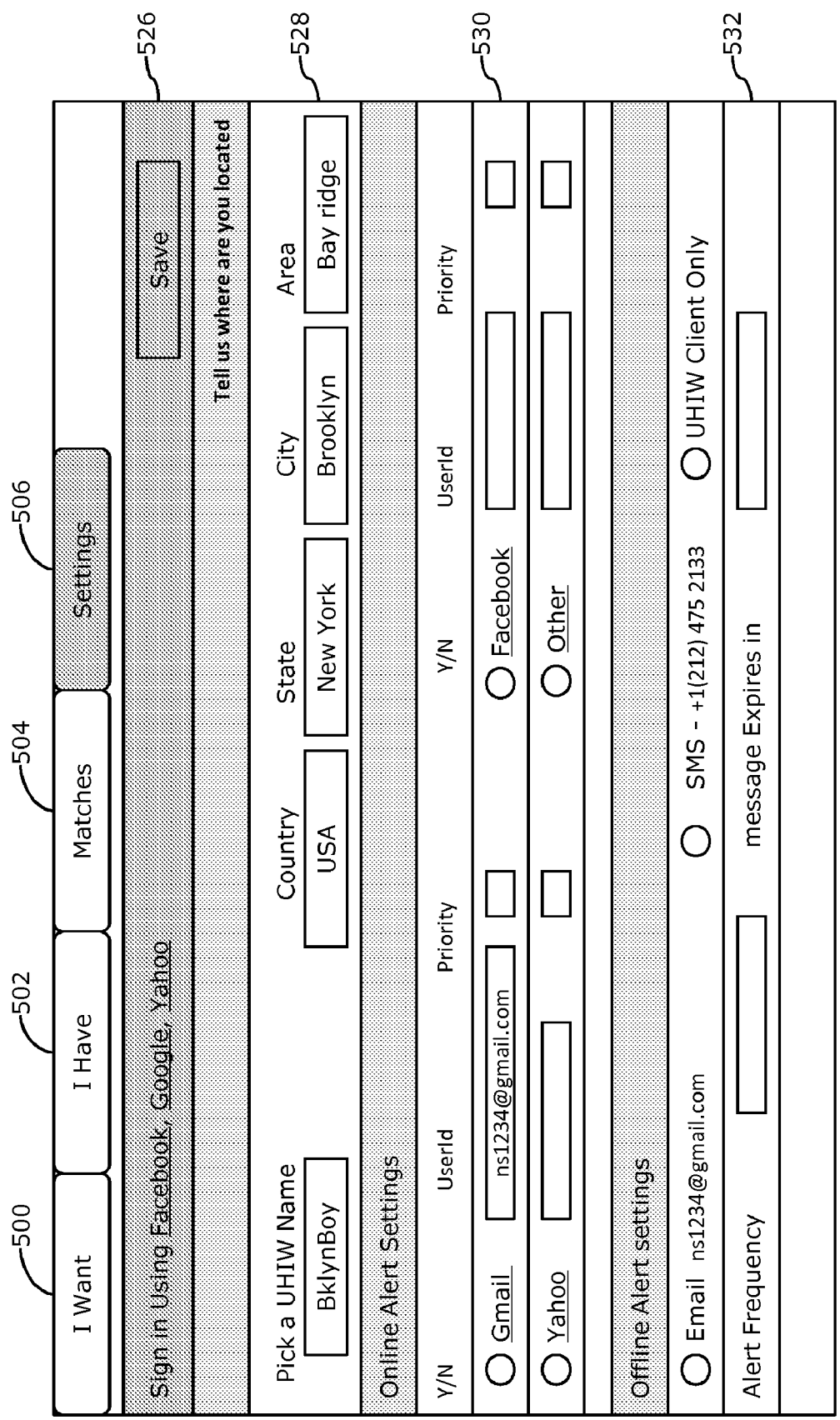
FIG. 5F is an example client interface illustrating a 'Settings' display for changing user profile and other information according to some embodiments.

UHIW client 104 may also provide a display to user 100 for changing her account settings. In FIG. 5F, an exemplary 'Settings' screen is illustrated. The 'Settings' Screen may comprise a Sign-in tab 526, a personal information area 528, an external chat information area 530 and an alerts information area 532. Personal information area 528 may comprise a user name, user location, UHIW ID etc.

External chat information area 530 allows user 100 to be connected to the UHIW application while available on external chat or email services. User 100 may provide priority to external chats and may provide her id or related information for receiving any message or chat request. User 100 may also sign in to external chat clients using sign-in tab 526. For an external chat client, UHIW application may store the corresponding server address (which may include address and port number for the particular external chat client), which enables a user to connect to that external chat client. Alerts information area 532 allows user 100 to receive messages when not on the Internet, e.g., to receive messages on his cell-phone or email. User 100 may select the frequency of the messages.

According to some embodiments, UHIW System may also provide a user with the option of tracking (listening to) 'I have' messages related to a specific field. Tracking may be done without posting an 'I want' message. This functionality is called 'listener'.

Figure 5G:
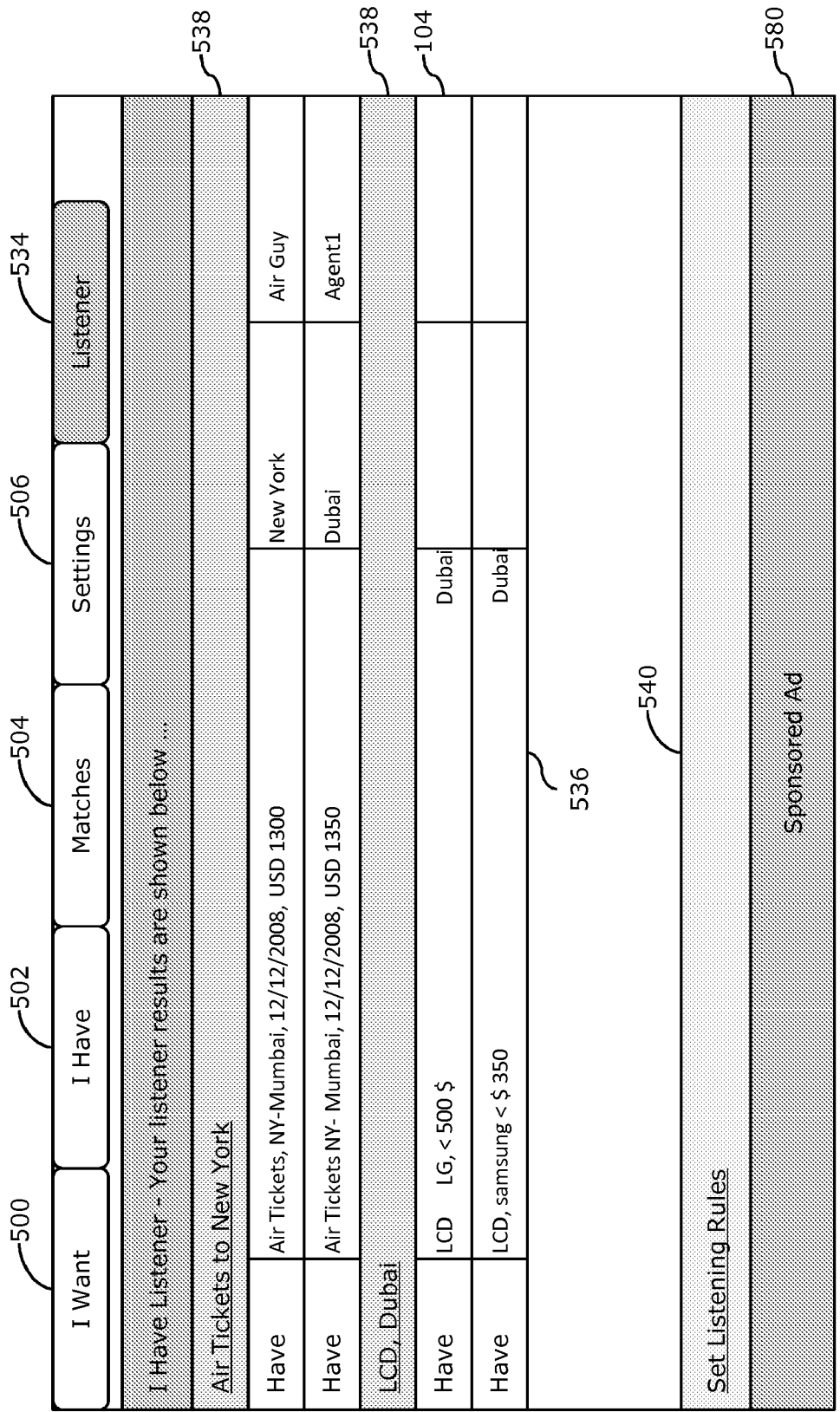
FIG. 5G is an example client interface illustrating a 'Listener' display for tracking offering details corresponding to specific listening rules according to some embodiments.
Figure 5H:
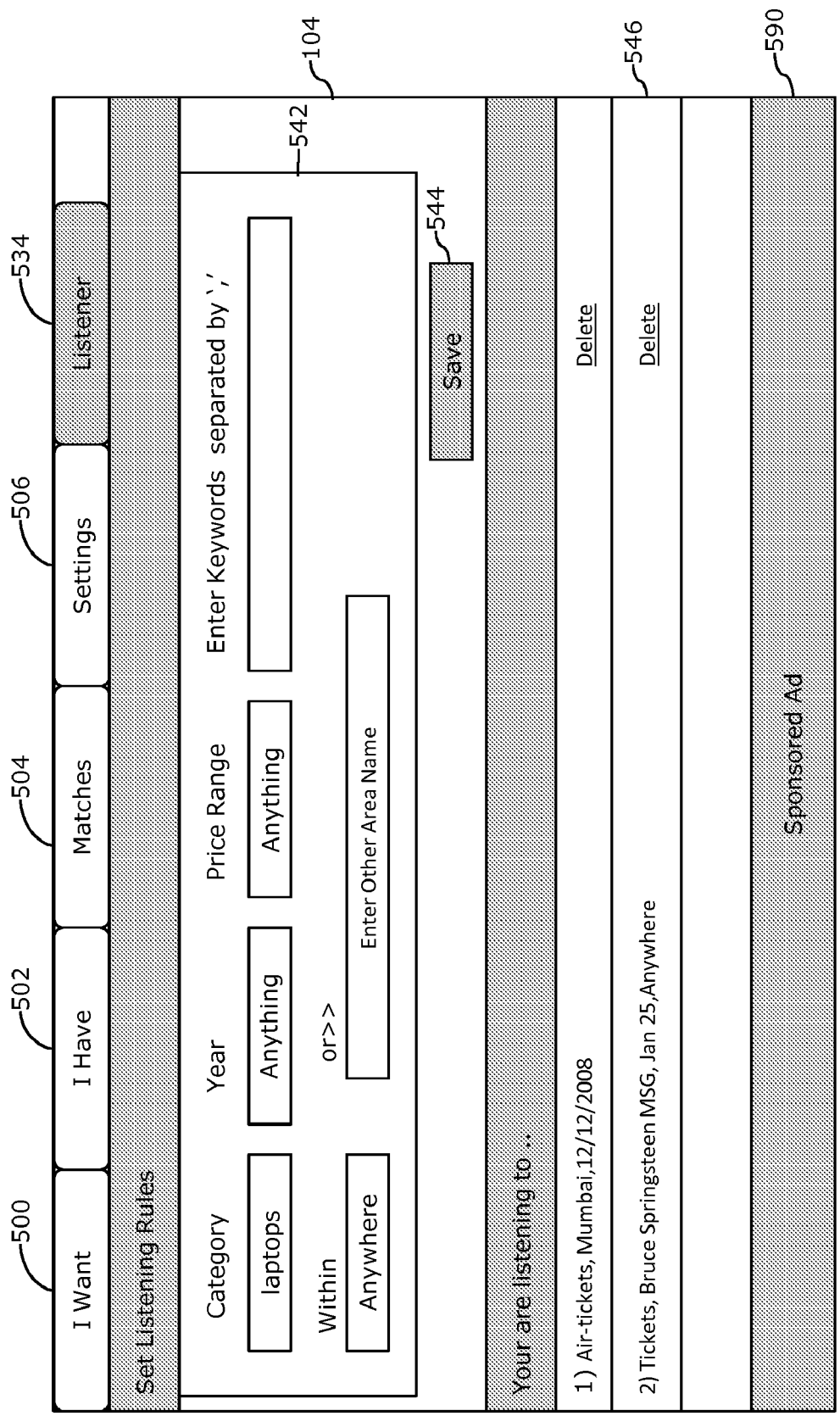
FIG. 5H is an example client interface illustrating a 'Set Listening rules' display for 'Listener' according to some embodiments.

FIGS. 5G and 5H presents the 'Listener' display and 'setting listening rules' display respectively. User 100 may view 'Listener' screen by clicking on listener tab 534. 'Listener' screen comprises a table 538 and a link 540 to set listening rules. User 100 may provide listening rules by clicking on listening rules link 540. She may be directed to a 'setting listening rules' screen, an example of which is illustrated in FIG. 5H. Keywords may be provided as listening rules.

Listening rules may be related to a product for which user 100 desires a periodic or continuous stream of information. The user may, for example, desire to eventually purchase air tickets to New York. For this purpose, user 100 may want to view all 'I have' messages related to 'Air Tickets to New York'. So, user 100 may provide 'Air tickets to New York' in the listening rules. After saving the rule using save button 544, the listening rule is submitted to UHIW Back-end system 106 and the rule is listed in table 546.

UHIW Back-end system 106 may match listening rules with stored 'I have' messages. Matched 'I have' messages (e.g., some or all matched 'I have' messages) may be presented to user 100 in table 538 in FIG. 5G. The messages may be presented and/or updated periodically and/or continuously.

According to some embodiments, user 100 may not directly contact users posting the 'I have' messages. After user 100 gets an idea of what people are selling in a particular domain, she may post an 'I want' message in a manner such that the message may match with the 'I have' messages that are of interest to her. Thus after suitable matching has been done, user 100 may contact the users associated with the matched results.

Figure 4:
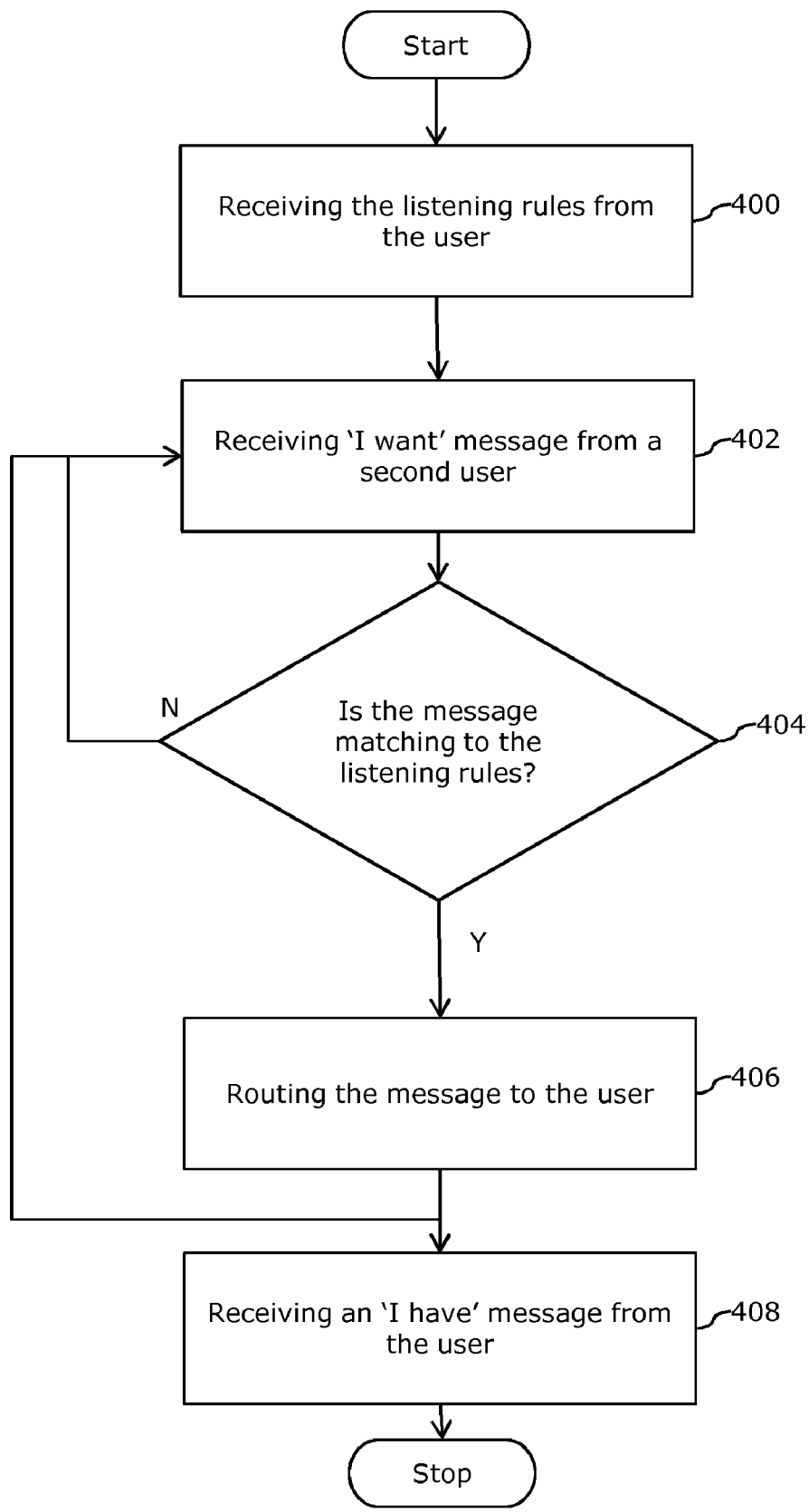
FIG. 4 is a flow diagram illustrating the handling of listening rules according to some embodiments.

FIG. 4 is a flow diagram illustrating a business listener option. Business listener option enables user 100 to track 'I want' messages, such as 'I want' messages related to a business specific category and thus may enable her to get business leads. In some embodiments, a user may pay to track 'I want' messages.

User 100 may click on Business Listener tab 548 (FIG. 5I) to view the 'Business Listener' display.

Figure 5I:
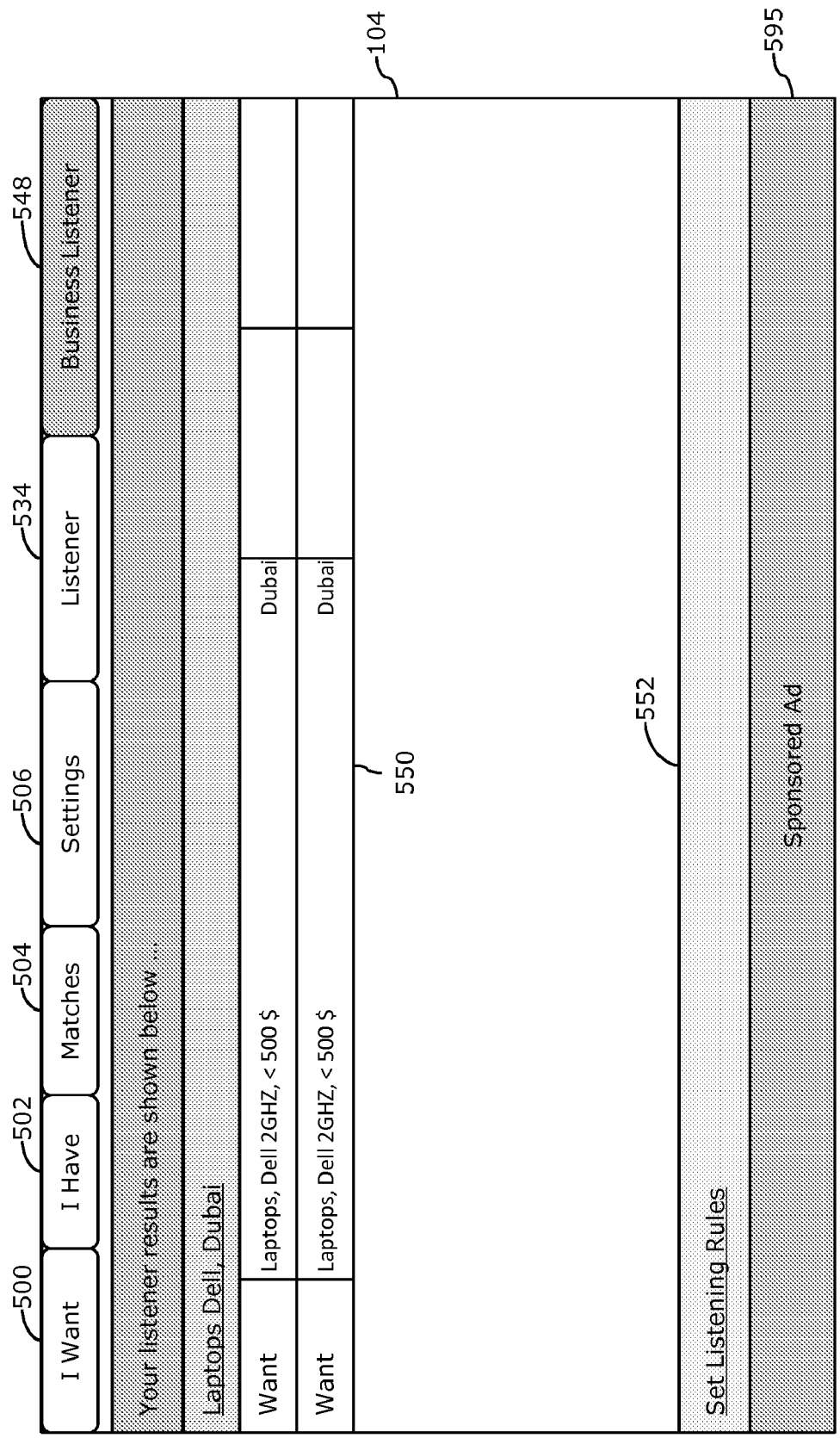
FIG. 5I is an example client interface illustrating a 'Business Listener' display for tracking requirement details corresponding to business specific listening rules according to some embodiments.
Figure 5J:
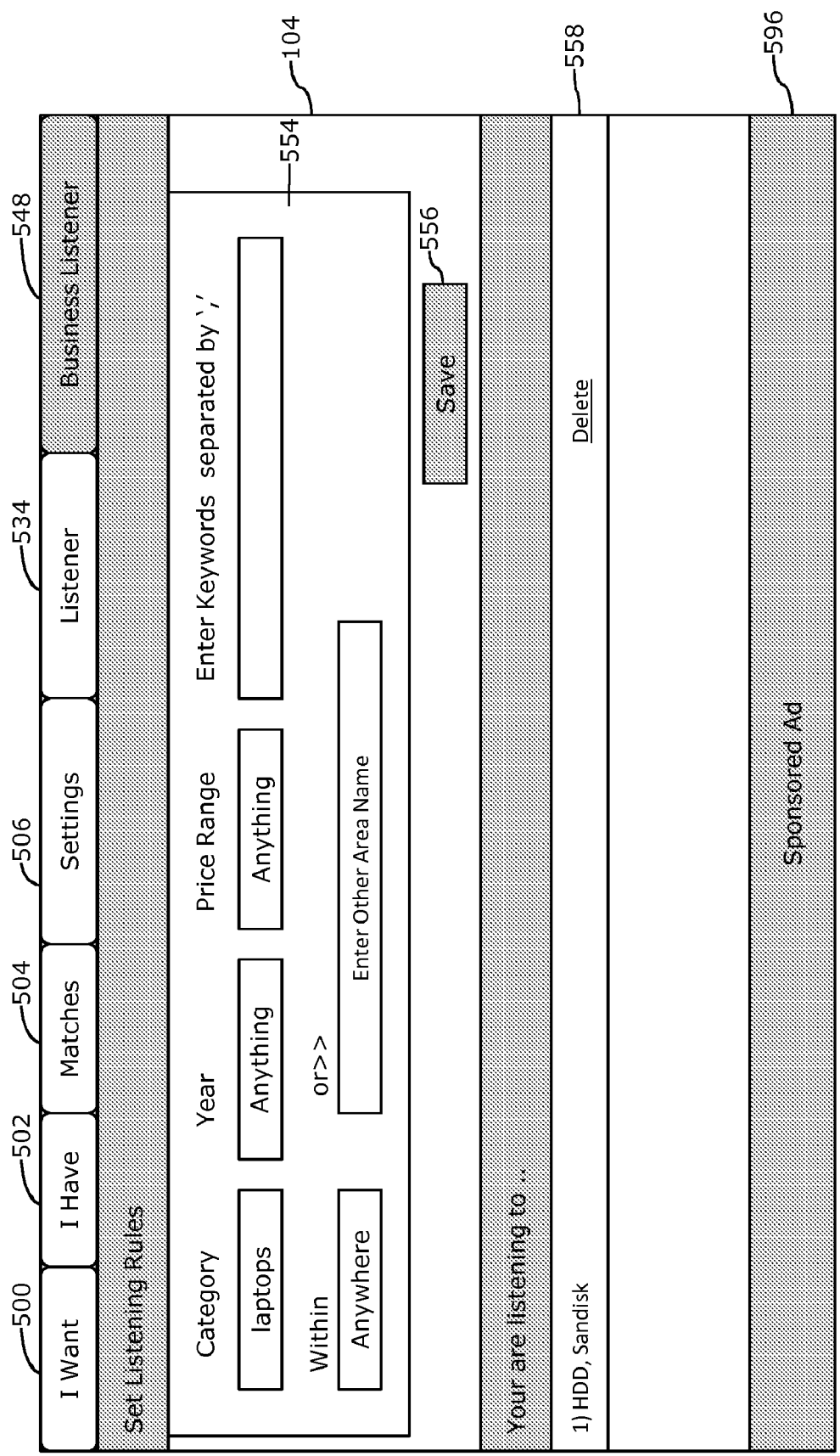
FIG. 5J is an example client interface illustrating a 'Set Listening rules' display for 'Business Listener' according to some embodiments.

At step 400, user 100 may provide some listening rules. As illustrated in FIG. 5I, user 100 may provide listening rules by clicking on listening rules link 540. She may be directed to a 'set listening rules' screen which has been illustrated in FIG. 5J. Keywords may be provided as listening rules.

Listening rules may be related to some specific products for which user 100 requires a continuous stream of information. For example user 100 may want to view all 'I want' messages related to 'laptops'. Accordingly, she may enter 'laptops' under the heading 'category' in text area 554. After saving the rule using save button 556, the listening rule is submitted to UHIW Back-end system 106 and the rule is listed in table 558.

At step 404, UHIW Back-end system 106 may match each received 'I want' message with the listening rules. Some or all matched 'I want' messages may be stored in database 202.

At step 406, some or all matched 'I want' messages may be presented to the user 100. The messages may be presented once, periodically, or continuously, according to various embodiments. According to some embodiments, a message may be presented to user 100 at run time after the message has been posted by another user. According to some embodiments, some or all matched results may be displayed on the listener screen in table 550. According to some embodiments, some or all matched results may be emailed to user 100 or may be sent to user 100 through chat client, or may be sent to the user via some other mode of communication After user 100 gets an indication of the 'I want' messages in the desired business specific category, she may post a new 'I have' message with UHIW Back-end system 106 to meet the requirements highlighted in those 'I want' messages. For example, user 100 may receive 20 messages which indicate that users are looking for Dell laptops, IBM laptops etc. which are 2 years old and within a specific price range. So user 100 may create a new 'I have' message such that UHIW Back-end system 106 will be able to match the new 'I have' message with those 20 'I want' messages. In the above mentioned example, chances of matching may be increased by user 100 by choosing keywords like 'Dell laptop' and '<2 years'. User 100 may also select keywords indicating geography if most of the 20 'I want' messages indicate that those users belong to a certain region and therefore may easily purchase laptops from that region. A business listener option thus enables a user to get an idea of the needs of people in a specific domain and then post an 'I have' message in a manner such that the message may match with large number of 'I want' messages and thus may reach a wider audience.

At step 408, user 100 may create an 'I have' message through the process described in FIG. 2. UHIW Back-end system 106 may then perform a match between this newly created 'I have' message and the 'I want' messages stored in database. The users who posted matched 'I want' messages will then be presented with the offering details of user 100 and may contact him though the process as discussed in FIG. 2.

Various Embodiments

The following are embodiments, not claims:

Embodiment A. A computer implemented method for providing person to person communication among a plurality of users, the method comprising the steps of:

Receiving requirement details for a first product from a first user, wherein the requirement details comprise a plurality of keywords associated with the first product;

Receiving offering details for a second product from a second user, wherein the offering details comprise a plurality of keywords associated with the second product;

Matching the requirement details of the first product with the offering details of the second product;

In the event of a successful match, presenting the offering details for the second product to the first user, wherein the presentation further comprises the option of contacting the second user;

Receiving an indication from the first user to contact the second user; and

Enabling the first user to contact the second user though a communication channel.

Embodiment B. The computer implemented method of embodiment A wherein the communication channel may be telecommunication, internet, or any other communication channel.

Embodiment C. The computer implemented method of embodiment A further comprising the steps of:

In the event of a successful match, presenting the requirement details of the first product to the second user, wherein the presentation further comprises the option of contacting the first user;

Receiving an indication from the second user to contact the first user; and

Enabling the second user to contact the first user though a communication channel.

Embodiment D. The computer implemented method of embodiment A wherein the first product may be a good, service or information.

Embodiment E. The computer implemented method of embodiment A wherein the second product may be a good, service or information.

Embodiment F. A computer implemented method for providing person to person communication among a plurality of users for commercial purposes, the method comprising:

Receiving requirement details for a first product from a first user, wherein the requirement details comprise a plurality of keywords associated with the first product;

Receiving offering details for a second product from a second user, wherein the offering details comprise a plurality of keywords associated with the second product;

Receiving offering details for a third product from a third user, wherein the offering details comprise a plurality of keywords associated with the third product;

Matching the requirement details of the first product with the offering details of the second product and the third product;

In the event of a successful match, presenting the second and third offering details to the first user in an arranged manner, wherein arrangement is done based on the keywords in the requirement details provided by the first user;

Receiving an indication from the first user to contact a target user, the target user being one of the second user and the third user; and Enabling the first user to contact the target user though a communication channel.

Embodiment G. The computer implemented method of embodiment F wherein the arrangement of offering details further comprises the arrangement according to the geography provided by the first user in the requirement details.

Embodiment H. The computer implemented method of embodiment F further comprising the steps of:

Receiving requirement details for a fourth product from a fourth user, wherein the requirement details comprises a plurality of keywords associated with the fourth product;

Matching the offering details of the second product with the requirement details of the first product and the fourth product;

In the event of a successful match, presenting the first and fourth requirements details to the second user in an arranged manner, wherein arrangement is done based on the keywords in the offering details provided by the second user;

Receiving an indication from the second user to contact a target user, the target user being one of the first user and the fourth user; and Enabling the second user to contact the target user though a communication channel.

Embodiment I. The computer implemented method of embodiment H wherein the arrangement of first and fourth requirement details further comprises the arrangement according to the geography provided by the second user in the offering details.

Embodiment J. A computer implemented method for establishing person to person communication, the method comprising:

Receiving 'listening' details corresponding to a first product from a first user, wherein the listening details comprise a plurality of keywords associated with the first product;

Matching the listening details with one or more requirement details stored in the database;

Presenting to the first user the requirement details that matched with the listening details;

Receiving offering details from the first user;

Matching the offering details with all the requirement details stored in the database;

Establishing communication between first user and one or more users corresponding to the matched requirement details; and Billing the first user.

In various embodiments, a first user may contact a second user who is logged onto an external chat service. For example, an 'I have' description submitted by the first user may have been matched with an 'I want' description entered by the second user. The first user may have thereupon been presented with an option to contact the second user.

In various embodiments, an external chat service may include a chat service run or maintained by a third party, and/or an unaffiliated chat service. Examples may include chat services offered by Google, AOL, and Yahoo.

According to various embodiments, messages may be relayed to an external chat service, and received from the external chat service, via an application programming interface (API). An example API is jYSMG, which provides an interface by which Java applications can utilize the Yahoo Instant Messenger protocol.

According to various embodiments, an API or other means may also be used to detect whether a user (e.g., the second user), is logged onto an external chat service. The second user may be identified via an alias that the second user employs on the external chat service. If the second user is logged on, then the first user may be informed that the second user is logged on. However, the first user may not necessarily be told the alias used by the second user on the external chat service. Rather, in some embodiments, the first user may be told a second, different alias. The second alias may correspond to an alias used by the second user on the present system according to various embodiments.

In various embodiments, a first description of a first product for sale is received from a first user. A second description of a second product that a second user desires to purchase is received from the second user. The first description is compared to the second description. It is determined that the first description matches the second description. For example, there are matches of one or more key words. It is determined that the first user is logged onto an external chat service. An indication that the first user is logged onto the external chat service is provided to the second user. For example, the second user is given the option to "click to chat" with the first user. An indication of a desire to communicate with the first user is received from the second user. For example, the second user actually does click on a link labeled "click to chat". A signal is sent to the first user, via the external chat service, indicating that the second user wishes to communicate with the first user. For example, a message is sent to the first user telling the first user that someone else's description has matched his description and that the other person wishes to chat. Permission is received from the first user to put the second user in communication with the first user. For example, the first user sends a message back in which he agrees to chat with the second user. A message is transmitted from the second user to the first user via the external chat service.

In various embodiments, determining that the first description matches the second description may comprise determining that a first word in the first description is the same as a second word in the second description. For example, the first description may be "sailing vessel" and the second description may be "water vessel". Accordingly, the two descriptions may be deemed a match because of the common word "vessel".

In various embodiments, determining that the first description matches the second description may comprise: determining a first geographic region based on the first description; determining a second geographic region based on the second description; and determining that the first geographic region is proximate to the second geographic region. Geographic regions may be determined from a description in various ways, including determining latitude and longitude coordinates, determining a city, determining GPS coordinates, determining a zip code, determining a state, determining a street address, determining a street intersection, determining a highway exit, determining a landmark, determining a subset of a large region (e.g., "Southern New Jersey" is a subset of "New Jersey"), and in various other ways, as will be appreciated. In various embodiments, a first geographic region may be deemed proximate to a second geographic region if the two regions are the same, if the two regions are within a predetermined distance of one another (e.g., if the two regions are within 10 miles of one another), if the two regions are on the same landmass (e.g., on the same island; e.g., on the same continent), if the two regions are accessible to one another (e.g., accessible by foot; e.g., accessible by car; e.g., accessible by bus), if the two regions are within the same city, if the two regions are within the same country, or if the two regions together satisfy one or more other criteria.

In various embodiments, a first alias is received from the first user, the first alias serving to identify the first user on the external chat service. It may then be determined whether the first user is logged onto the external chat service by checking the status of the first alias with the external chat service. For example, the first alias may be "joe1999". It may be determined whether the first user is logged on by checking the status of "joe1999" with the external chat service (e.g., via an API).

In various embodiments, even if a first user has a first alias on an external chat service, the first user may designate a second alias on an internal chat service or other communication system. For example, even if the first user is known as "joe1999" on an external chat service, the user may provide an alias "sam555" on an internal chat service. In this way, a second user may have the option of communicating with the first user internally, but may be unable to identify the first user outside of the system. E.g., the second user may know the alias "sam555", but may remain ignorant of the alias "joe1999". In this way, the privacy and/or anonymity of the first user may be maintained.

In various embodiments, a first and second user may communicate via a combination of external and internal chat services. For example, a second user may use an internal chat service to send a message to a first user who is logged onto an external chat service. The system, according to some embodiments, may then relay the message to the external chat service, so that it reaches the first user. The message may be relayed using an API to the external chat service, for example.

In various embodiments, a user who posts an 'I want' or 'I have' message may receive multiple matches. The matches may then be presented to the user in a particular order (e.g., in an order defined by a top-to-bottom arrangement, a left-to-right arrangement, or any other arrangement). In some embodiments, the matches may be ordered according to one or more criteria. In some embodiments for two or more matches, a geographic distance is determined between locations indicated in the matched descriptions. For example, if message 1 is matched with message 2, and message 1 describes location A, and message 2 describes location B, then a distance may be determined between location A and location B. With distances among matched descriptions determined, the matches may be sorted according to distance. In some embodiments, matches that correspond to shorter distances may be displayed before (e.g., above; e.g., to the left of) matches corresponding to longer distances.

In some embodiments, a user may provide a description that receives multiple matched descriptions. Two matched descriptions may match on different keywords, however. For example a user may enter "Tennis racket Brooklyn". The user may receive two matches, with the following descriptions: "tennis racket" and "Brooklyn racket". In some embodiments, multiple matched descriptions may be presented to a user in a certain order based on which key words have matched. In determining the order of matches presented, certain key words or categories of key words may be given more weight or higher priority than others. For example, key words that indicate or correspond to geography may be given higher priority than other key words. Thus, "Brooklyn racket" may be given the higher priority among the two matches described above, since the matched word of "Brooklyn" has a geographic connotation, whereas the matched word of "tennis" does not. Note that both of the above descriptions have matched on the word "racket", so this word may not favor either match in terms of priority.

Categories of key words may include words that pertain to geography, words that pertain to product age, words that pertain to product quality, words that pertain to product price, and other categories.

For example, in some embodiments, matches based on key words relating to geography may be given priority over matches relating to words based on product age.

It will be appreciated that, in some embodiments, matches need not only be made based on key words, and that other factors leading to matches may be used in determining the order of matches. For example, pairs of matched descriptions may be ordered based on the degree of similarity in price between each of the two matched descriptions.

In various embodiments, various rules may be used for alerting a user to a match. Rules may specify how frequently a user is to be alerted about new matches, at what address a user is to be alerted (e.g., which of multiple addresses a user has provided is to be used to alert the user), which mode of communication is to be used to alert a user (e.g., email versus short messaging service), for which types of matches a user is to be alerted (e.g., a user is to be alerted for matches on all key words, but not for matches on only one key word), and any other criteria.

A rule may specify a frequency with which a user is to be alerted about new matches. For example, a rule may specify that a user is to be alerted immediately about a new match, that a user is to be alerted once a day about all his new matches, that a user is to be alerted once a week about all his new matches, or any other frequency. In some embodiments, a user may be alerted with different frequencies on different modes of communication. For example, a user may be alerted after every match on his cell phone, but only once per day at his email address.

In some embodiments, an alert may alternately be sent to one of two different addresses, depending on the type or nature of a match. For example, a user may be sent an alert for a match on his cell phone (e.g., via SMS) if there is a match on price, but an alert at his email address if there is a match on geography. For instance, a user may consider certain types of matches more urgent than others, and may therefore wish to be alerted e.g., on a cell phone for more urgent matches, and on email for less urgent matches.

In some embodiments, a first user may receive a match substantially immediately (e.g., within a very short period;

e.g., within a few seconds) after entering a first description. For example, the first description entered by the first user may match a second description previously entered by a second user. In some embodiments, the first user may later receive another match on the first description. The new match may be with a third description that was entered by a third user after the first user had entered the first description. Thus, the first user may receive a second match significantly after having received the first match (e.g., an hour later; e.g., a day later; e.g., a week later). Thus, in various embodiments, matches may be sought for a given description long after the description has been entered.

In various embodiments, a user posting an 'I have' message may enter a network address indicating a location where more information can be found about the product being described. The network address may be a uniform resource locater (URL), for example.

In various embodiments, communication among users employing different modes of communication may be facilitated. For example, through the system, a user on a chat client (internal or external) may communicate with a user employing a cellular phone (e.g., using SMS). In various embodiments, the system may receive a first message from a first user via an Internet chat client and transmit the first message to a cellular phone belonging to a second user via Short Messaging Service. The system may also perform the reverse process. Namely, the system may receive an SMS message and transmit the message to the Internet chat client.

In various embodiments, a first user who has posted an 'I have' message can view the search criterion used to find the product he has posted. Thus, in some embodiments, if a second user has entered search criterion (e.g., has entered key words) that have matched the product posted by the first user, then the first user will have the opportunity to view the search criterion (e.g., the keywords) entered by the second user. In some embodiments, the first user may further view other information about the second user, such as an identifier or alias of the second user.

In some embodiments, a search criterion entered by the second user may include an indication of a geographic region.

It will be understood that while various embodiments have been illustrated and discussed, these are not to be construed as limiting. Various alterations may be made thereto without departing from the broader spirit and scope of the various contemplated embodiments. The specification and drawings are, accordingly, to be regarded in an illustrative sense rather than a restrictive sense.

What is claimed is:

1. A method comprising:
   receiving, by a matchmaking system, from a first user a first description of a first product for sale and from a second user a second description of a second product that the second user desires to purchase;
   comparing, by a processor of the matchmaking system, the first description to the second description;
   determining, by the processor, that the first description matches the second description by determining that a first word in the first description is the same as a second word in the second description, determining a first geographic region based on the first description, determining a second geographic region based on the second description, and determining that the first geographic region and the second geographic region are within a specified geographical reach;
   presenting a result of the first description matching the second description to the first user, the result including a user chat identifier for the second user and a selectable indicator corresponding to an availability of the second user on a chat service external to the matchmaking system;
   receiving, from the first user, a selection of the selectable indicator corresponding to the first user desiring to chat with the second user;
   sending, via the external chat service, a signal to second user indicating that the first user wishes to communicate with the second user;
   receiving permission from the second user to put the first user in communication with the second user; and
   transmitting a message from the first user using a chat service internal to the matchmaking system to the second user via the external chat service.

2. The method of claim 1 further comprising:
   receiving the user chat identifier from the second user, the user chat identifier serving to identify the second user on the external chat service; and
   determining the availability of the second user onto the external chat service by checking the status of the user chat identifier with the external chat service.

3. The method of claim 2, further comprising:
   receiving an alias from the second user, in which the alias is different from the user chat identifier; and
   causing the alias to be displayed to the first user.

4. The method of claim 2, further comprising receiving the message from the second user via the internal chat service, wherein the internal chat service is different than the external chat service.

5. The method of claim 1, further comprising:
   receiving from a third user a third description of a third product for sale;
   determining that the second description matches the third description;
   determining a first geographic region based on the first description;
   determining a second geographic region based on the second description;
   determining a third geographic region based on the third description;
   determining a first distance based on the first geographic region and the second geographic region;
   determining a second distance based on the second geographic region and the third geographic region;
   determining that the first distance is less than the second distance; and
   causing to be displayed, for the first user, indications of the first product and of the third product, in which the indication of the first product is displayed above the indication of the third product based on the determination that the first distance is less than the second distance.

6. The method of claim 1, wherein determining that the first description matches the second description comprises determining that a first word in the first description matches a second word in the second description, the method further comprising:
   receiving from a third user a third description of a third product for sale;
   determining that a third word in the second description matches a fourth word in the third description, in which the third word is different from the second word;
   determining a first category associated with the second word;
   determining a second category associated with the third word;
   determining a first priority associated with the first category;

determining a second priority associated with the second category;

determining that the first priority is higher than the second priority; and displaying, for the first user, indications of the first product and of the third product, in which the indication of the first product is displayed above the indication of the third product based on the determination that the first priority is higher than the second priority.

7. The method of claim 6, wherein the first category is geography and the second category is product age.

8. A method comprising:

receiving from a first user a first description of a first product;

receiving from the first user a first address to be used for sending communications to the first user, the first address being an alias on an external chat service;

receiving front the first user a rule for sending communications;

receiving from a second user a second description of a second product;

determining, by a processor, that the first description matches the second description; and transmitting to the first user a first message describing the second product, the first message being sent to the first address via the external chat service, and the first message being sent in accordance with the rule.

9. The method of claim 8, wherein the rule specifies a frequency with which to send communications.

10. The method of claim 8, wherein the rule specifies one of a plurality of addresses to be used for sending communications to the first user, the method further comprising:

receiving from the first user a second address to be used for sending communications to the first user;

receiving from a third user a third description of a third product;

determining that the first description matches the third description;

transmitting to the first user a second message describing the third product, the second message being sent to the second address, and the second message being sent in accordance with the rule.

11. The method of claim 8, wherein the first address is a wireless device identifier and wherein the first message is sent to a corresponding wireless device via Short Message Service.

12. A non-transitory computer-readable storage medium storing a set of instructions that, when executed by one or more processors, causes the one or more processors to perform operations comprising:

receiving, by a matchmaking system, from a first user a first description of a first product for sale and from a second user a second description of a second product that the second user desires to purchase;

comparing, by a processor of the matchmaking system, the first description to the second description;

determining, by the processor, that the first description matches the second description by determining that a first word in the first description is the same as a second word in the second description;

presenting a result of the first description matching the second description to the first user, the result including a user chat identifier for the second user and a selectable indicator corresponding to an availability of the second user on a chat service external to the matchmaking system;

detecting the availability of the second user on the external chat service;

receiving, from the first user, a selection of the selectable indicator corresponding to the first user desiring to chat with the second user;

sending, via the external chat service, a signal to the second user indicating that the first user wishes to communicate with the second user;

receiving permission from the second user to put the first user in communication with the second user; and transmitting a message from the first user using a chat service internal to the matchmaking system to the second user via the external chat service, and based on the second user being offline on the external chat service, transmitting an offline message from the first user to the second user using a communications channel designated by the second user, the communications channel comprising one of electronic mail, a wireless device communication, and the external chat service.

13. A system comprising:

a processor;

an input module, implemented by the processor, configured to receive from a first user a first description of a first product for sale and from a second user a second description of a second product that the second user desires to purchase;

a matching engine, implemented by the processor, configured to:

compare the first description to the second description; and determine that the first description matches the second description by determining that a first word in the first description is the same as a second word in the second description;

an output module, implemented by the processor, configured to present a result of the first description matching the second description to the first user, the result including a user chat identifier for the second user and a selectable indicator corresponding to an availability of the second user on a chat service external to the matchmaking system; and a chat engine, implemented by the processor, configured to:

detect the availability of the second user on the external chat service;

receive, from the first user, a selection of the selectable indicator corresponding to the first user desiring to chat with the second user;

send, via the external chat service, a signal to the second user indicating that the first user wishes to communicate with the second user;

receive permission from the second user to put the first user in communication with the second user; and transmit a message from the first user using a chat service internal to the matchmaking system to the second user via the external chat service, and based on the second user being offline on the external chat service, transmit an offline message from the first user to the second user using a communications channel designated by the second user, the communications channel comprising one of electronic mail, a wireless device communication, and the external chat service.

* * * * *

UNITED STATES PATENT AND TRADEMARK OFFICE
CERTIFICATE OF CORRECTION

PATENT NO. : 8,346,622 B2
APPLICATION NO. : 12/427014
DATED : January 1, 2013
INVENTOR(S) : Naresh Shetty It is certified that error appears in the above-identified patent and that said Letters Patent is hereby corrected as shown below:

In the Claims

In column 14, line 7, in Claim 1, after "to", insert --the--, therefor.

In column 15, line 18, in Claim 8, delete "front" and insert --from--, therefor.

Signed and Sealed this
Fifth Day of November, 2013

Teresa Stanek Rea
*Deputy Director of the United States Patent and Trademark Office*